US008938604B2

(12) United States Patent
Liu et al.

(10) Patent No.: US 8,938,604 B2
(45) Date of Patent: Jan. 20, 2015

(54) DATA BACKUP USING DISTRIBUTED HASH TABLES

(71) Applicant: Huawei Technologies Co., Ltd., Shenzhen (CN)

(72) Inventors: Xian Liu, Santa Clara, CA (US); Daohui Wang, Shenzhen (CN); Deping Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/706,068

(22) Filed: Dec. 5, 2012

(65) Prior Publication Data
US 2013/0111187 A1    May 2, 2013

Related U.S. Application Data

(63) Continuation of application No. PCT/CN2011/075048, filed on May 31, 2011.

(51) Int. Cl.
| G06F 12/00 | (2006.01) |
| G06F 12/10 | (2006.01) |
| G06F 3/06 | (2006.01) |
| G06F 11/20 | (2006.01) |

(52) U.S. Cl.
CPC .......... *G06F 12/1018* (2013.01); *G06F 3/0614* (2013.01); *G06F 3/0626* (2013.01); *G06F 3/0673* (2013.01); *G06F 3/065* (2013.01); *G06F 3/067* (2013.01); *G06F 11/2094* (2013.01)
USPC ........................................... 711/216; 711/162

(58) Field of Classification Search
None
See application file for complete search history.

(56) References Cited

U.S. PATENT DOCUMENTS

| 6,470,438 B1 | 10/2002 | McCormick |
| 7,443,841 B2 | 10/2008 | Davis |

(Continued)

FOREIGN PATENT DOCUMENTS

| CN | 1674492 A | 9/2005 |
| CN | 101685468 A | 3/2010 |
| CN | 101783761 A | 7/2010 |
| CN | 102023809 A | 4/2011 |
| WO | WO 2009/126562 A1 | 10/2009 |

OTHER PUBLICATIONS

C. Dubnicki et al. HYDRAstor: A scalable secondary storage. In Proceedings of the Eighth USENIX Conference on File and Storage Technologies (FAST), pp. 197-210, Feb. 2009.*

(Continued)

*Primary Examiner* — Jared Rutz
*Assistant Examiner* — Brendan Lillis
(74) *Attorney, Agent, or Firm* — Brinks Gilson & Lione

(57) ABSTRACT

The present disclosure provides a storage system for data read and write. One embodiment of the storage system includes an origination device that is configured to receive a request for a logical block addressing-based operation on a volume, convert the logical block addressing-based operation request into a key addressing-based operation request carrying a key corresponding to data to be operated, and send the key addressing-based operation request to a routing library; the routing library is configured to receive the key addressing-based operation request, hash the key corresponding to the data to be operated, determine that a storage node taking charge of a hash region in which the hashed key is located is the master storage node, send the key addressing-based operation request to the master storage node of the data to be operated.

12 Claims, 8 Drawing Sheets

(56) References Cited

U.S. PATENT DOCUMENTS

| | | | |
|---|---|---|---|
| 8,352,692 B1* | 1/2013 | Jordan | 711/162 |
| 2005/0094805 A1 | 5/2005 | Kitani et al. | |
| 2007/0162692 A1* | 7/2007 | Nishimoto et al. | 711/113 |
| 2007/0192553 A1* | 8/2007 | Otani et al. | 711/162 |
| 2008/0005334 A1* | 1/2008 | Utard et al. | 709/226 |
| 2009/0282048 A1* | 11/2009 | Ransom et al. | 707/10 |
| 2010/0070698 A1 | 3/2010 | Ungureanu et al. | |
| 2012/0005424 A1* | 1/2012 | Shi et al. | 711/114 |
| 2012/0203980 A1 | 8/2012 | Flynn et al. | |
| 2013/0036289 A1* | 2/2013 | Welnicki et al. | 711/173 |
| 2013/0262865 A1* | 10/2013 | Irvine | 713/165 |

OTHER PUBLICATIONS

Written Opinion of the International Searching Authority issued in corresponding PCT Application No. PCT/CN2011/075048 (including English Translation and Verification of Translation); mailed May 31, 2011.

Original International Search Report issued in corresponding PCT Application No. PCT/CN2011/075048; mailed Mar. 1, 2012.

International Search Report issued in corresponding PCT Patent Application No. PCT/CN2011/075048, mailed Mar. 1, 2012.

* cited by examiner

DATA BACKUP USING DISTRIBUTED HASH TABLES

CROSS-REFERENCE TO RELATED APPLICATIONS

This application is a continuation of International Application No. PCT/CN2011/075048, filed on May 31, 2011, which is hereby incorporated by reference in its entireties.

FIELD

The present disclosure relates to the field of information technologies, and in particular, to a data read and write method and apparatus, and a storage system.

BACKGROUND

With the development of the network, information grows in an explosive way, and people's data reaches an unprecedented scale. The storage and management of the large-scale data becomes a big challenge. Although the capacity of a hard disk is increasingly large and a storage speed is continuously increased, it is difficult to satisfy requirements of mass information management in aspects such as extensibility, reliability, and high availability of a storage sub-system in conventional ways of direct hard disk storage and adopting a plurality of external disk arrays.

In the prior art, a typical block storage system may generally be simplified into an origination end and a destination end. The origination end locally generates a volume and establishes a connection with the destination end, and meanwhile forwards an input (Input; I for short)/output (Output; O for short) request for a local device file to the destination end for processing. The destination end manages a storage device and process a final I/O request. The origination end and the destination end communicate with each other through a block interface of a storage protocol such as an internet small computer system interface (internet Small Computer System Interface; iSCSI for short)/fiber channel (Fiber Channel; FC for short)/advanced technology attachment over Ethernet (Advanced Technology Attachment over Ethernet; AOE for short)/network block device (Network Block Device; NBD for short).

The origination end mainly includes an access unit, for implementing local volume management and establishing a connection with the destination end through protocols (such as the iSCSI, the FC, or the AOE) and communicating with the destination end. The destination end mainly includes a volume control unit and a redundant array of independent disk (Redundant Array of Independent Disk; RAID for short) control unit. The RAID control unit manages a specific physical disk, builds an RAID group, and forms a logical disk. The volume control unit manages the logical disk generated by the RAID control unit, divides logical volumes according to requirements, and exposes the logical volumes through the protocol such as the iSCSI, the FC, or the AOE for the origination end to use.

However, in the prior art, a block storage service provided by the destination end has a limit in aspects such as reliability, availability, extensibility, and cheapness.

Specifically, in the aspects of reliability and availability, in the prior art, data reliability is ensured mainly by building the RAID in a cabinet of the destination end and adopting multi-controller head redundancy (for example, a dual controller disk array), but if a power supply of the cabinet is faulty or two or more controller heads are faulty at the same time, problems such as data loss or service interruption may occur, further affecting the availability. In the aspect of extensibility, if the destination end adopts the Internet storage area network (Internet Storage Area Network; IP SAN for short) or fiber channel storage area network (FC Storage Area Network; FC SAN for short), the capacity of the destination end is limited by the processing capability of the controller head of the IP SAN or the FC SAN, so that the maximum supported capacity is limited, and a large scale expansion cannot be performed.

In the aspect of maintainability, in a disk array built by the RAID group, when a disk in the RAID group is faulty, the disk needs to be replaced in time and the RAID needs to be rebuilt, to ensure redundancy and data reliability. This requires the maintenance personnel to perform the replacement at any time, and the system cannot process such fault automatically.

In the aspect of cheapness, the price of the IP SAN or the FC SAN, especially the FC SAN, used as the destination end is high, and relevant switch devices required to support the IP SAN or the FC SAN are also expensive. A storage server used as the destination end is relatively cheap, but the storage server has a low requirement on a processor and a memory, so the disk I/O performance is low.

SUMMARY

Embodiments of the present disclosure provide a data read and write method and apparatus and a storage system, for improving reliability, availability, extensibility, and cheapness of the storage system.

An embodiment of the present disclosure provides a data processing method. In the method, an origination device receives a request for a data operation on a volume, where the request for the data operation is a logical block addressing-based operation request. The block storage driver converts the logical block addressing-based operation request into a key addressing-based operation request, where the key addressing-based operation request carries a key corresponding to the data to be operated. The block storage driver sends the key addressing-based operation request to a routing library, so that the routing library sends, according to the key corresponding to the data to be operated, the key addressing-based operation request to a master storage node, and the master storage node perform a read or write operation according to the key addressing-based operation request.

An embodiment of the present disclosure further provides a data processing apparatus having a processor. The data processing apparatus includes: a receiving module, configured to receive a request for a data operation on a volume, where the request for the data operation is a logical block addressing-based operation request; a conversion module, configured to convert the logical block addressing-based operation request into a key addressing-based operation request, where the key addressing-based operation request carries a key corresponding to the data to be operated; and a sending module, configured to send the key addressing-based operation request to a routing library, so that the routing library sends, according to the key corresponding to the data to be operated, the key addressing-based operation request to a master storage node, and the master storage node perform a read or write operation according to the key addressing-based operation request.

The present disclosure further provides a storage system, including an origination device, a routing library, a master storage node, and at least one backup node, where the origination device is configured to receive a request for a data operation on a volume, where the request for the data operation is a logical block addressing-based operation request, convert the logical block addressing-based operation request into a key addressing-based operation request, and send the key addressing-based operation request to the routing library, where the key addressing-based operation request carries a key corresponding to data to be operated; the routing library is configured to receive the key addressing-based operation request sent by the block storage driver, and send, according to the key corresponding to the data to be operated, the key addressing-based operation request to the master storage node; the master storage node is configured to receive the key addressing-based operation request sent by the routing library, and perform a read or write operation on the data to be operated.

Through the embodiments of the present disclosure, after receiving the request for logical block addressing-based operation on the volume, the block storage driver of the origination device converts the logical block addressing-based operation request into the key addressing-based operation request, and then sends the key addressing-based operation request to the routing library, so that the routing library sends, according to the key which is carried in the key addressing-based operation request and corresponds to the data to be operated, the key addressing-based operation request to the master storage node and the at least one backup node of the data to be operated, and the master storage node and the at least one backup node perform the read or write operation on the data to be operated. Thereby, reliability, availability, extensibility, and cheapness of the storage system may be improved, and mass storage requirements for high extensibility, high reliability, high availability, and cheapness may be satisfied.

BRIEF DESCRIPTION OF THE DRAWINGS

To illustrate the solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the objectives, solutions, and advantages of the present disclosure more clear, the solutions according to embodiments of the present disclosure are clearly and completely described in the following with reference to the accompanying drawings. Apparently, the embodiments in the following description are merely a part rather than all of the embodiments of the present disclosure. All other embodiments obtained by persons skilled in the art based on the embodiments of the present disclosure without creative effects shall fall within the protection scope of the present disclosure.

Figure 1:
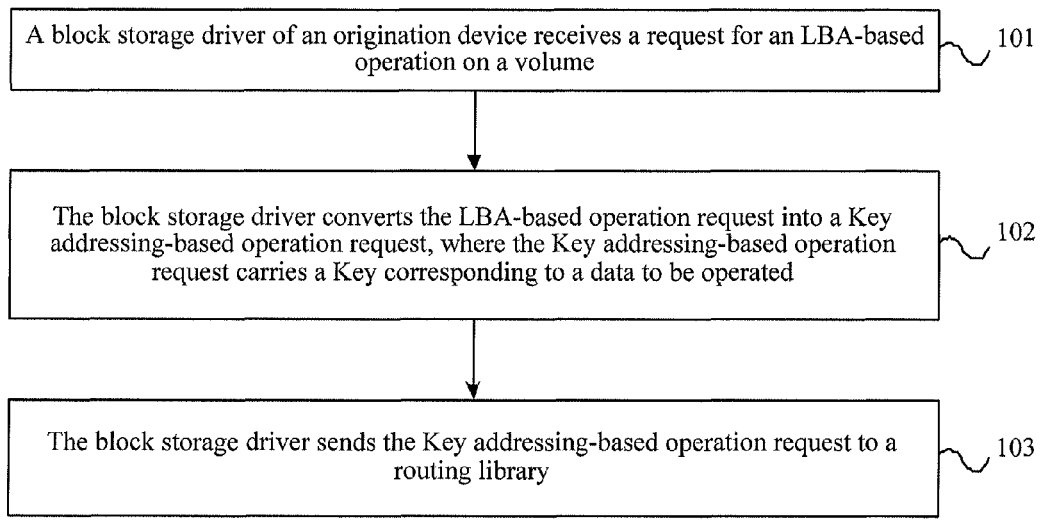
FIG. 1 is a flowchart of an embodiment of a data read and write method according to the present disclosure.

FIG. 1 is a flowchart of an embodiment of a data read and write method according to the present disclosure. As shown in FIG. 1, the data read and write method may include:

Step 101: A block storage driver of an origination device receives a request for a logical block addressing-based (Logical Block Addressing; LBA for short) operation on a volume.

In this embodiment, the origination device may be any application server. Definitely, this embodiment is not limited thereto, and this embodiment does not limit the specific form of the origination device.

Step 102: The block storage driver converts the LBA-based operation request into a key (Key) addressing-based operation request, where the Key addressing-based operation request carries a Key corresponding to data to be operated.

Step 103: The block storage driver sends the Key addressing-based operation request to a routing library, so that the routing library sends, according to the Key corresponding to the data to be operated, the Key addressing-based operation request to a master storage node and at least one backup node of the data to be operated, and the master storage node and the at least one backup node perform a read or write operation on the data to be operated.

In this embodiment, before the block storage driver of the origination device receives the request for the LBA-based operation on the volume, the origination device initializes and starts the block storage driver to save an Internet Protocol (Internet Protocol; IP for short) address and a service port of at least one storage node in a storage system. Then, when the routing library is located in the block storage driver, the origination device saves connections between the block storage driver and all or part of storage nodes in the storage system; or, when the routing library is located in the storage node, the block storage driver directly establishes a connection between the block storage driver and the storage node. Then, the origination device may receive a command for creating a volume, where the command includes a volume name of the volume to be created and a volume size of the volume to be created. Then, the block storage driver of the origination device creates, according to the command, a volume logic device in a local operating system of the origination device. Furthermore, the routing library also needs to acquire the IP address and the service port of each storage node in the storage system and a hash (Hash) region in the charge of each storage node and establish connections between the routing library and all or part of storage nodes. In the foregoing process, the origination device may create a local volume.

In this embodiment, for example, the sending, by the routing library according to the Key corresponding to the data to be operated, the Key addressing-based operation request to the master storage node and the at least one backup node of the data to be operated may be: hashing, by the routing library, the Key corresponding to the data to be operated; determining that a storage node taking charge of a hash region in which the hashed Key is located is the master storage node of the data to be operated; sending the Key addressing-based operation request to the master storage node of the data to be operated; and determining, according to a predetermined backup policy, the at least one backup node of the data to be operated, and sending the Key addressing-based operation request to the at least one backup node.

For example, the storage nodes in the storage system all have node identities. When the at least one backup node of the data to be operated is determined, the at least one backup node of the data to be operated may be successively selected according to the predetermined backup policy, in an order of ascending or descending in terms of node identities from the master storage node. For example, when the predetermined backup policy is that each data to be operated has two backups, two backup nodes are successively selected as the backup nodes of the data to be operated, in the order of ascending or descending in terms of node identities from the master storage node.

In an implementation manner in this embodiment, when the operation request is a write operation request and the data to be operated is data to be written, the write operation request may further carry the data to be written. At this time, the performing, by the master storage node and the at least one backup node, the write operation on the data to be operated may be:

The master storage node and the at least one backup node locally write, according to a key of the data to be written, the data to be written, record a version of the written data, and after the write operation is completed, return a write operation response to the routing library.

Then, the routing library receives the write operation response according to a preset write operation policy, calculates the number of successful write operations, and returns a response, which is a response to the Key addressing-based write operation request, to the block storage driver according to the number of successful write operations and the preset write operation policy.

In another implementation manner of this embodiment, when the operation request is a read operation request and the data to be operated is data to be read, the performing, by the master storage node and the at least one backup node, the read operation on the data to be operated may be: reading, by the master storage node and the at least one backup node according to a key of the data to be read, a locally stored data to be read and a version of the data to be read, and returning the read data, the version of the read data, and a read operation response to the routing library.

Then, the routing library may receive the returned data according to a preset read operation policy, calculate the number of successful read operations, identify data of a latest version in the read data according to the number of successful read operations and the preset read operation policy, and return the data of the latest version to the block storage driver, so that the block storage driver processes the data of the latest version and then returns data corresponding to the LBA-based read operation request.

In this embodiment, the block storage driver, the routing library, the master storage node, and the at least one backup node may all be implemented by using a distributed hash table (Distributed Hash Table; DHT) technology. In this embodiment, the data to be operated has at least two backups, so the data cannot be lost. Therefore, the data read and write method provided by this embodiment may improve reliability of the storage system. The data to be operated has at least two backups, so the storage system may provide read and write all the time, and a fault of a certain storage node in the storage system will not cause that the data cannot be read and written. Therefore, the data read and write method provided by this embodiment can improve availability of the storage system. Furthermore, the DHT technology itself has the characteristic of high extensibility, so the data read and write method provided by this embodiment may improve extensibility of the storage system. Finally, the storage system implemented based on the DHT technology needs no specially customized hardware and only uses a universal hardware device, for example, a personal computer (Personal Computer; PC), so the data read and write method provided by this embodiment may add to cheapness of the storage system. In sum, the data read and write method provided by this embodiment may satisfy mass storage requirements for high extensibility, high reliability, high availability, and cheapness.

In the description of the following embodiments of the present disclosure, an example with the block storage driver being a DHT block storage driver is used for illustration, the routing library being a DHT routing library, and the master storage node and at least one backup node being nodes in a DHT-based Key-value storage system. The DHT-based Key-value storage system is a distributed Key-value storage system implemented by using the DHT technology, the Key is a unique identity of data, and the value is data content.

Figure 2:
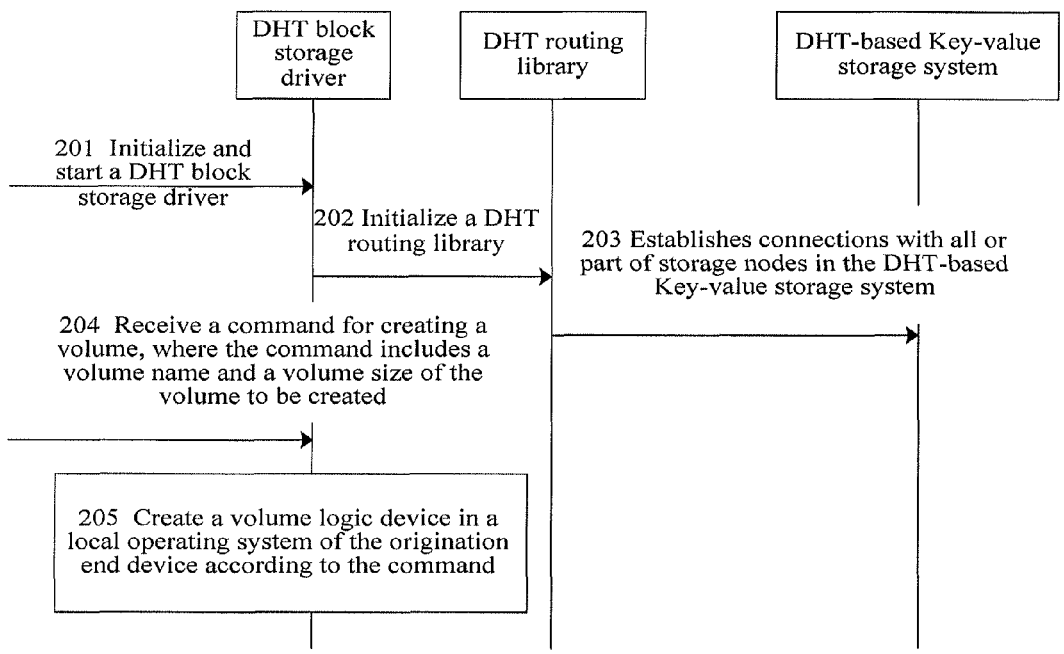
FIG. 2 is a flowchart of an embodiment of a method for creating a local volume according to the present disclosure.

An interaction procedure for the origination device to create the local volume in the embodiment of the present disclosure is introduced in the following. FIG. 2 is a flowchart of an embodiment of a method for creating a local volume according to the present disclosure. As shown in FIG. 2, the method may include:

Step 201: An origination device initializes and starts a DHT block storage driver.

For example, the origination device specifies a uniform resource locator (Uniform Resource Locator; URL) list of storage nodes in a DHT-based Key-value storage system. The URL list may save an IP address and a service port of at least one storage node. The purpose for saving the IP address and the service port of the at least one storage node is mainly that, in a case that a certain storage node cannot communicate normally, another storage node may be used.

Step 202: Initialize a DHT routing library.

In this embodiment, the main purpose of initializing the DHT routing library is to establish a connection with the DHT-based Key-value storage system. For example, if the DHT routing library is located in the DHT block storage driver, after the DHT routing library is initialized, the origination device saves a connection pool, where the connection pool includes connections between the DHT block storage driver of the origination device and all or part of storage nodes in the DHT-based Key-value storage system, that is to say, the connection pool in the origination device saves the connections between the DHT routing library and all or part of the storage nodes in the DHT-based Key-value storage system. If the DHT routing library is located in the storage node of the DHT-based Key-value storage system, the DHT block storage driver directly establishes a connection with the storage node which has the DHT routing library and is in the DHT-based Key-value storage system.

Step 203: The DHT routing library establishes the connections with all or part of the storage nodes in the DHT-based Key-value storage system.

Furthermore, the DHT routing library further acquires information about each storage node in the DHT-based Key-value storage system, where the information includes an IP address and a port of each storage node and a Hash region in the charge of each storage node.

In this embodiment, the DHT routing library maintains the connections between the DHT routing library and all or part of storage nodes in the DHT-based Key-value storage system in a form of a pool.

Step 204: The DHT block storage driver of the origination device receives a command for creating a volume, where the command includes a volume name and a volume size of the volume to be created.

The volume name may be any character, character string, and/or figure. This embodiment does not limit a representation form of the volume name, as long as the volume name of the volume to be created is unique in the storage system.

Step 205: After receiving the command, the DHT block storage driver of the origination device creates a volume logic device in a local operating system of the origination device according to the command. At this point, the creation of the local volume is completed.

Figure 3A:
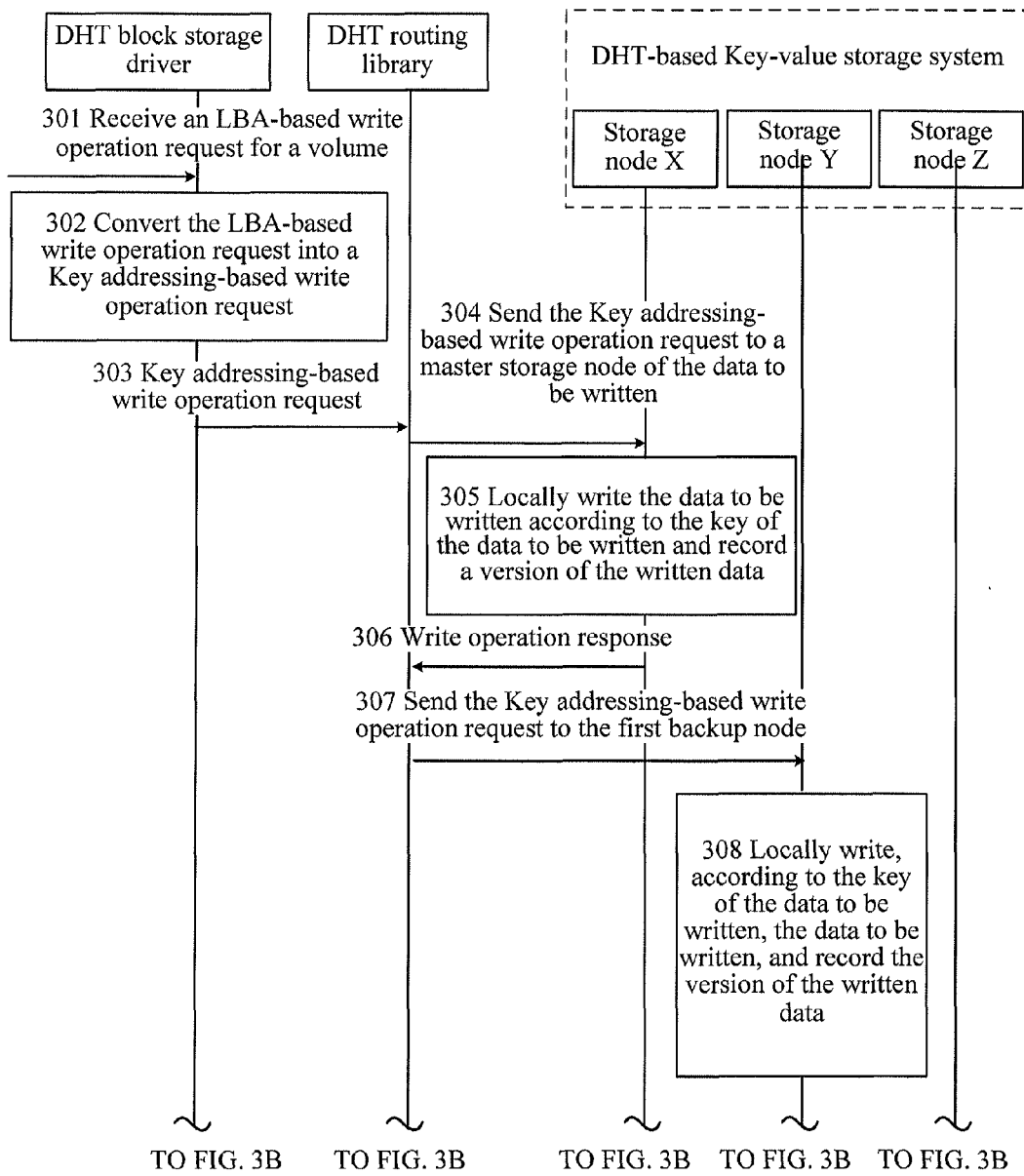
FIGS. 3A and 3B are flowcharts of an embodiment of a data write method according to the present disclosure.
Figure 3B:
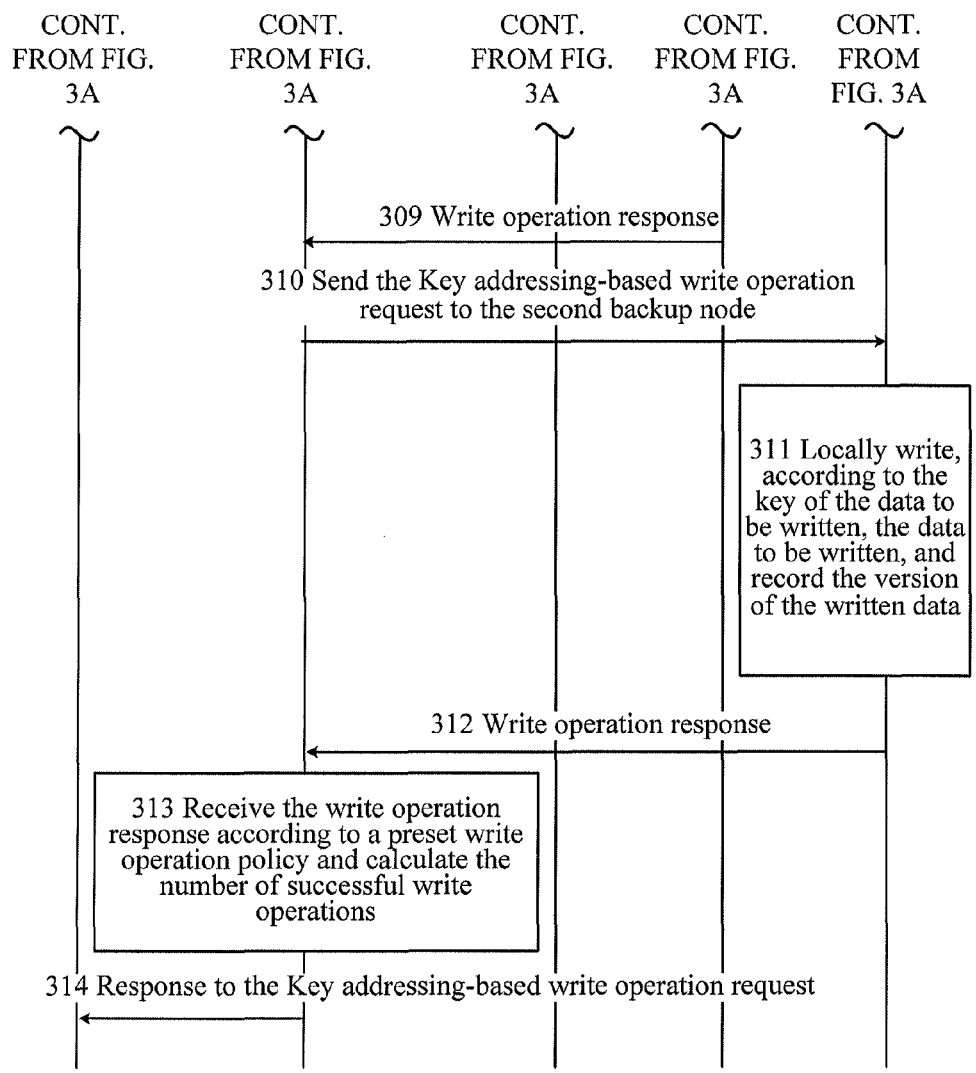

FIG. 3 is a flowchart of an embodiment of data write method according to the present disclosure. In this embodiment, it is assumed that three copies for each data exist. As shown in FIG. 3, the data write method may include:

Step 301: A DHT block storage driver receives a request for an LBA-based write operation on a volume.

The LBA-based write operation request carries data to be written, a number of a start sector to be written in, and the number of sectors to be written in.

It should be noted that, the sector is a minimum access unit of a disk, and a default sector size of an existing disk is 512 bytes (Byte).

Step 302: The DHT block storage driver converts the LBA-based write operation request into a Key addressing-based write operation request, where the Key addressing-based write operation request carries data to be written and a Key corresponding to the data to be written.

In this embodiment, multiple conversion manners for converting the LBA-based write operation request into the Key addressing-based write operation request exist. A typical conversion manner may be as follows: Key=volume name+(LBA number of LBA-based write operation request×512/value data block size), where only an integer portion of a quotient of the division is taken. The volume name is a volume name of the volume, the LBA number of the LBA-based write operation request is an integer number carried in the LBA-based write operation request, 512 is the default sector size of the existing disk, and the value data block size refers to a fixed length of a value corresponding to each Key saved in a DHT-based Key-value storage system. For example, if the volume name is "nbd0", the LBA number of the LBA-based write operation request is 35, and the value data block size is 4096 bytes, key="nbd0_4". In this way, LBA-based write operation requests with the LBA number of 32, 33, 34, and 35 are actually converted into "nbd0_4" Key addressing-based write operation requests.

Furthermore, it should be noted that, a mapping relationship between a length (that is, the number of sectors to be written in) of the LBA-based write operation request and the number of the converted Key addressing-based write operation requests exists. If a length of the data, which is to be written, in the LBA-based write operation request is greater than the value data block size, the LBA-based write operation request is converted into at least two Key addressing-based write operation requests. For example, if the LBA numbers carried in the LBA-based write operation request is 32, 33, 34, 35, 36, 37, and 38, according to the foregoing conversion manner, the LBA-based write operation request is converted into two Key addressing-based write operation requests. Keys in the two Key addressing-based write operation requests are "nbd0_4" and "ndb0_5" respectively. For the write operation request when Key="nbd0_4", the corresponding sectors to be written in are 32, 33, 34, and 35. For the write operation request when Key="nbd0_5", the corresponding sectors to be written in are 36, 37, and 38.

Step 303: The DHT block storage driver sends the Key addressing-based write operation request to a DHT routing library.

In this embodiment, the DHT routing library may be located in the DHT block storage driver or may be located in a storage node in the DHT-based Key-value storage system. If the DHT routing library is located in the DHT block storage driver, the DHT block storage driver may send the Key addressing-based write operation request to the DHT routing library through local language interface invocation. If the DHT routing library is located in the storage node, the DHT block storage driver may interact with the storage node in which the DHT routing library is located, so as to send the Key addressing-based write operation request to the DHT routing library.

Step 304: The DHT routing library sends the Key addressing-based write operation request to a master storage node of the data to be written.

For example, the DHT routing library hashes the Key of the data to be written, where the Key of the data to be written is carried in the received Key addressing-based write operation request, then determines that a storage node taking charge of a Hash region in which the hashed Key is located is the master storage node of the data to be written, and finally sends the Key addressing-based write operation request to the master storage node.

Step 305: The master storage node locally writes, according to the key of the data to be written, the data to be written, and records a version of the written data.

A representation manner of the version of the written data may be a time stamp, a vector clock, or another manner. This embodiment does not limit the representation manner of the version of the written data.

Step 306: The master storage node returns a write operation response to the DHT routing library.

For example, if the writing succeeds, the master storage node returns a write success response to the DHT routing library; while if the writing fails, the master storage node returns a write failure response to the DHT routing library.

Step 307: The DHT routing library determines, according to a predetermined backup policy, a first backup node of the data to be written, and sends the Key addressing-based write operation request to the first backup node.

The backup policy may be a cross-rack backup policy or a cross-data center backup policy, which is not limited in this embodiment as long as the DHT routing library can determine, according to the backup policy, the backup node of the data to be written.

Step 308: The first backup node locally writes, according to the key of the data to be written, the data to be written, and records the version of the written data.

A representation manner of the version of the written data may be a time stamp, a vector clock, or another manner. This embodiment does not limit the version of the written data.

Step 309: The first backup node returns the write operation response to the DHT routing library.

For example, if the writing succeeds, the first backup node returns the write success response to the DHT routing library; while if the writing fails, the first backup node returns the write failure response to the DHT routing library.

Step 310: The DHT routing library determines, according to the predetermined backup policy, a second backup node of the data to be written, and sends the Key addressing-based write operation request to the second backup node.

Step 311: The second backup node locally writes, according to the key of the data to be written, the data to be written, and records the version of the written data.

Step 312: The second backup node returns the write operation response to the DHT routing library.

For example, if the writing succeeds, the second backup node returns the write success response to the DHT routing library; while if the writing fails, the second backup node returns the write failure response to the DHT routing library.

In this embodiment, step 304 to step 312 may be an asynchronous operation process.

Step 313: The DHT routing library receives the write operation response according to a preset write operation policy and calculates the number of successful write operations.

In this embodiment, the DHT-based Key-value storage system supports different write operation policies. For example, the write operation policy may be set as follows: if two of three copies are written successfully, the write operation succeeds, which means that, when data is stored in the DHT-based Key-value storage system, the data is written into three different storage nodes (three copies); in the write operation process, as long as the data is successfully written into two storage nodes, the whole write operation may be considered to be successful; the remaining copy may be synchronized by a daemon. In this way, the speed of the write operation may be improved, and the number of data backups is not detracted.

Step 314: The DHT routing library returns a response, which is a response to the Key addressing-based write operation request, to the DHT block storage driver according to the number of successful write operations and the preset write operation policy.

Referring to the example in step 313, after the data is successfully written into two storage nodes, the whole write operation is considered to be successful. At this time, the DHT routing library returns a write operation success response to the DHT block storage driver. If the data is successfully written into only one storage node or the data is successfully written into none of the storage nodes, the DHT routing library returns a write operation failure response to the DHT block storage driver.

In this embodiment, the data to be written has at least two backups, so the data cannot be lost. Therefore, the data write method provided by this embodiment may improve reliability of the DHT-based Key-value storage system. The data to be written has at least two backups, so the DHT-based Key-value storage system may perform the write operation all the time, and a fault of a certain storage node in the storage system will not cause that the data cannot undergo write operation. Therefore, the data write method provided by this embodiment may improve availability of the DHT-based Key-value storage system. Furthermore, the DHT technology itself has the characteristic of high extensibility, so the data write method provided by this embodiment can improve extensibility of the DHT-based Key-value storage system. Finally, the storage system implemented based on the DHT technology needs no specially customized hardware and only uses a universal hardware device, for example, a PC, so the data write method provided by this embodiment may add to cheapness of the DHT-based Key-value storage system. In sum, the data write method provided by this embodiment can satisfy mass storage requirements for high extensibility, high reliability, high availability, and cheapness.

Figure 4A:
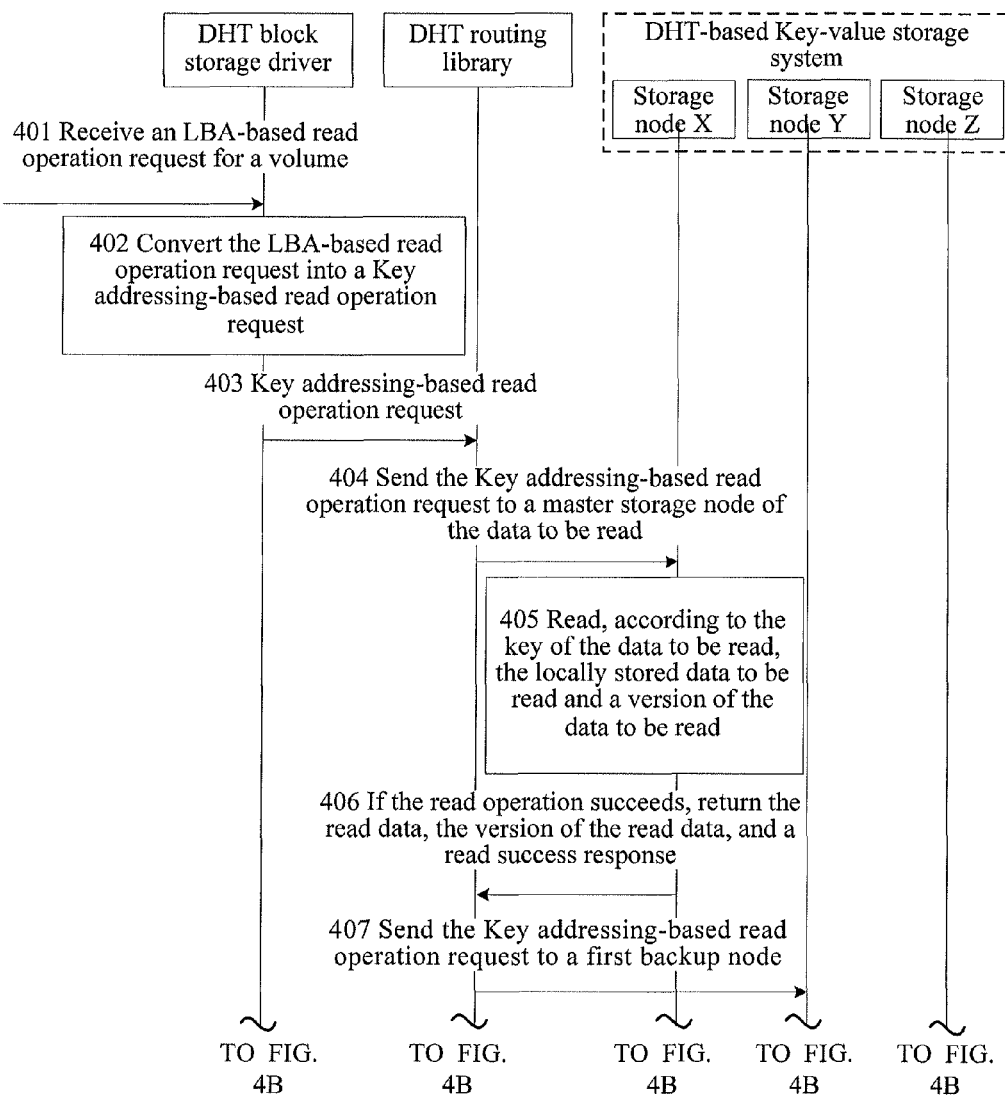
FIGS. 4 A and 4B are flowcharts of an embodiment of a data read method according to the present disclosure.
Figure 4B:
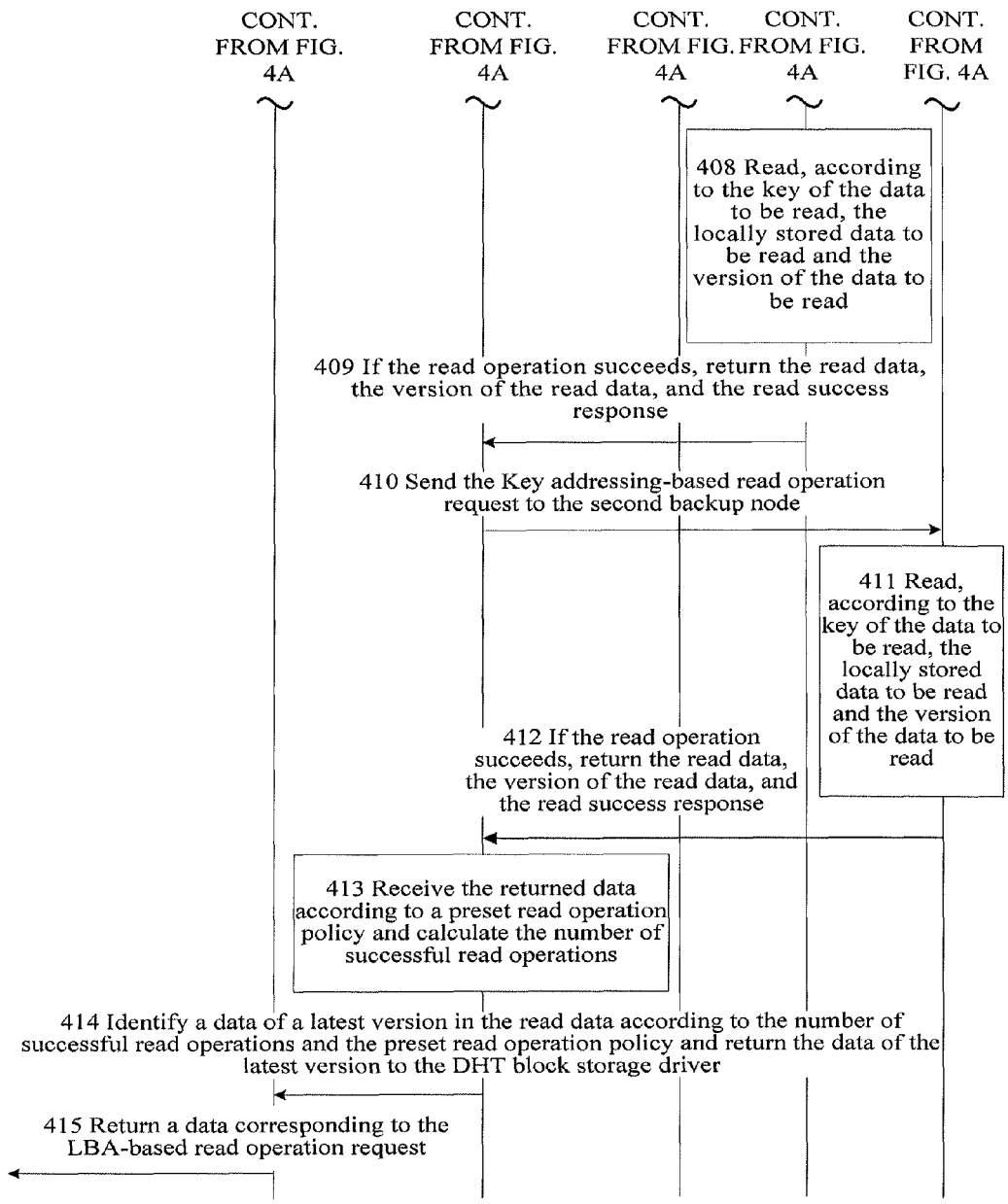

FIG. 4 is a flowchart of an embodiment of a data read method according to the present disclosure. In this embodiment, it is assumed that three copies for each data exist. As shown in FIG. 4, the data read method may include:

Step 401: A DHT block storage driver receives a request for an LBA-based read operation on a volume.

The LBA-based read operation request carries an LBA number and the number of sectors to be read.

It should be noted that, the sector is a minimum access unit of a disk, and a default sector size of an existing disk is 512 bytes (Byte).

Step 402: The DHT block storage driver converts the LBA-based read operation request into a Key addressing-based read operation request, where the Key addressing-based read operation request carries a Key corresponding to data to be read.

For example, the manner for converting the LBA-based read operation request into the Key addressing-based read operation request is the same as that for converting an LBA-based write operation request into a Key addressing-based write operation request, and is not described here again.

Step 403: The DHT block storage driver sends the Key addressing-based read operation request to a DHT routing library.

In this embodiment, the DHT routing library may be located in the DHT block storage driver or a storage node in the DHT-based Key-value storage system. If the DHT routing library is located in the DHT block storage driver, the DHT block storage driver may send the Key addressing-based read operation request to the DHT routing library through local language interface invocation. If the DHT routing library is located in the storage node, the DHT block storage driver may interact with the storage node in which the DHT routing library is located, and send the Key addressing-based read operation request to the DHT routing library.

Step 404: The DHT routing library sends the Key addressing-based read operation request to a master storage node of the data to be read.

For example, the DHT routing library hashes the Key of the data to be read carried in the received Key addressing-based read operation request, then determines that a storage node taking charge of a Hash region in which the hashed Key is located is the master storage node of the data to be read, and finally the DHT routing library sends the Key addressing-based read operation request to the master storage node.

Step 405: The master storage node reads, according to the key of the data to be read, the locally stored data to be read and a version of the data to be read.

A representation manner of the version may be a time stamp, a vector clock, or another manner. This embodiment does not limit the representation manner of the version of the data to be read.

Step 406: If the read operation succeeds, the master storage node returns the read data, the version of the read data, and a read success response to the DHT routing library.

If the read operation fails, the master storage node returns null or another failure response to the DHT routing library.

Step 407: The DHT routing library determines, according to a predetermined backup policy, a first backup node of the data to be read, and sends the Key addressing-based read operation request to the first backup node.

The backup policy may be a cross-rack backup policy or a cross-data center backup policy, which is not limited in this embodiment as long as the DHT routing library can determine, according to the backup policy, the backup node of the data to be read.

Step 408: The first backup node reads, according to the key of the data to be read, the locally stored data to be read and the version of the data to be read.

Step 409: If the read operation succeeds, the first backup node returns the read data, the version of the read data, and the read success response to the DHT routing library.

If the read operation fails, the first backup node returns null or another failure response to the DHT routing library.

Step 410: The DHT routing library determines, according to the predetermined backup policy, a second backup node of the data to be read, and sends the Key addressing-based read operation request to the second backup node.

Step 411: The second backup node reads, according to the key of the data to be read, the locally stored data to be read and the version of the data to be read.

Step 412: If the read operation succeeds, the second backup node returns the read data, the version of the read data, and the read success response to the DHT routing library.

If the read operation fails, the second backup node returns null or another failure response to the DHT routing library.

In this embodiment, step 404 to step 412 may be an asynchronous operation process.

Step 413: The DHT routing library receives the returned data according to a preset read operation policy and calculates the number of successful read operations.

In this embodiment, the DHT-based Key-value storage system supports different read operation policies. For example, the read operation policy may be set as follows: if one of three copies are read successfully, the read operation succeeds, which means that, when data is read from the DHT-based Key-value storage system, the data may be read from any one of three storage nodes (three copies); as long as the data is successfully read from one storage node, the whole read operation may be considered to be successful.

Step 414: The DHT routing library identifies data of a latest version in the read data according to the number of successful read operations and the preset read operation policy, and returns the data of the latest version to the DHT block storage driver.

Step 415: The DHT block storage driver processes the data of the latest version and then returns data corresponding to the LBA-based read operation request.

For example, if an LBA-based read operation request is converted into at least two Key addressing-based read operation requests, the DHT block storage driver needs to merge the data of the latest version. If a Key addressing-based read operation request corresponds to at least two LBA-based read operation requests, the DHT block storage driver needs to segment the data of the latest version.

In this embodiment, the data to be read has at least two backups, so the data cannot be lost. Therefore, the data read and write method provided by this embodiment may improve reliability of the DHT-based Key-value storage system. The data to be read has at least two backups, so the DHT-based Key-value storage system may perform the read operation all the time, and a fault of a certain storage node in the storage system will not cause that the data cannot undergo read operation. Therefore, the data read and write method provided by this embodiment may improve availability of the DHT-based Key-value storage system. Furthermore, the DHT technology itself has the characteristic of high extensibility, so the data read and write method provided by this embodiment may improve extensibility of the DHT-based Key-value storage system. Finally, the storage system implemented based on the DHT technology needs no specially customized hardware and only uses a universal hardware device, for example, a PC, so the data read and write method provided by this embodiment may add to cheapness of the DHT-based Key-value storage system. In sum, the data read method provided by this embodiment may satisfy mass storage requirements for high extensibility, high reliability, high availability, and cheapness.

Persons of ordinary skill in the art should understand that all or part of the steps in the foregoing method embodiments may be implemented by a program instructing relevant hardware. The program may be stored in a computer readable storage medium. When the program is run, the steps in the method embodiments are performed. The storage medium may be any medium that is capable of storing program codes, such as a ROM, a RAM, a magnetic disk, or an optical disk.

Figure 5:
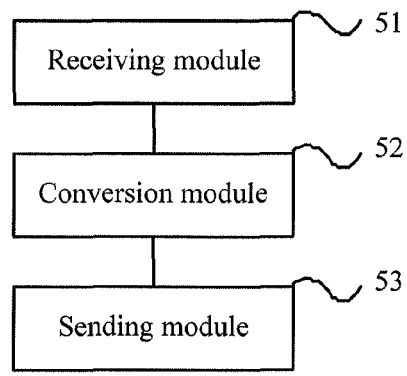
FIG. 5 is a schematic structural diagram of an embodiment of a data read and write apparatus according to the present disclosure.

FIG. 5 is a schematic structural diagram of an embodiment of a data read and write apparatus according to the present disclosure. The data read and write apparatus in this embodiment may be a server having a processor used as an origination device or a part of the origination device to implement the procedure of the embodiment shown in FIG. 1 according to the present disclosure. As shown in FIG. 5, the data read and write apparatus may include:

a receiving module 51, configured to receive a request for an LBA-based operation on a volume;

a conversion module 52, configured to convert the LBA-based operation request into a Key addressing-based operation request, where the Key addressing-based operation request carries a Key corresponding to data to be operated; and a sending module 53, configured to send the Key addressing-based operation request to a routing library, so that the routing library sends, according to the Key corresponding to the data to be operated, the Key addressing-based operation request to a master storage node and at least one backup node of the data to be operated, and the master storage node and the at least one backup node perform a read or write operation on the data to be operated.

The data read and write apparatus may improve reliability, availability, extensibility, and cheapness of a storage system, satisfying mass storage requirements for high extensibility, high reliability, high availability, and cheapness.

Figure 6:
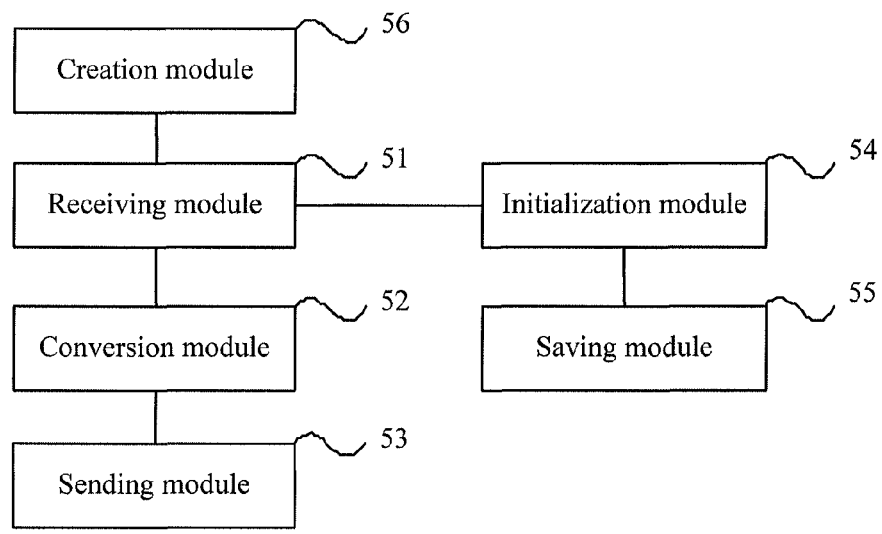
FIG. 6 is a schematic structural diagram of another embodiment of a data read and write apparatus according to the present disclosure.

FIG. 6 is a schematic structural diagram of another embodiment of a data read and write apparatus according to the present disclosure. In comparison with the data read and write apparatus shown in FIG. 5 in that, the difference is in that, the data read and write apparatus shown in FIG. 6 may further include:

an initialization module 54, configured to initialize and start a block storage driver;

a saving module 55, configured to save an IP address and a service port of at least one storage node in a storage system, and when the routing library is located in the block storage driver, save connections between the block storage driver and all or part of storage nodes in the storage system; and a creation module 56, configured to: after the receiving module 51 receives a command for creating a volume, create a volume logic device in a local operating system of the origination device according to the command, where the command includes a volume name of the volume to be created and a volume size of the volume to be created.

The data read and write apparatus may improve reliability, availability, extensibility, and cheapness of the storage system, satisfying mass storage requirements for high extensibility, high reliability, high availability, and cheapness.

Figure 7:
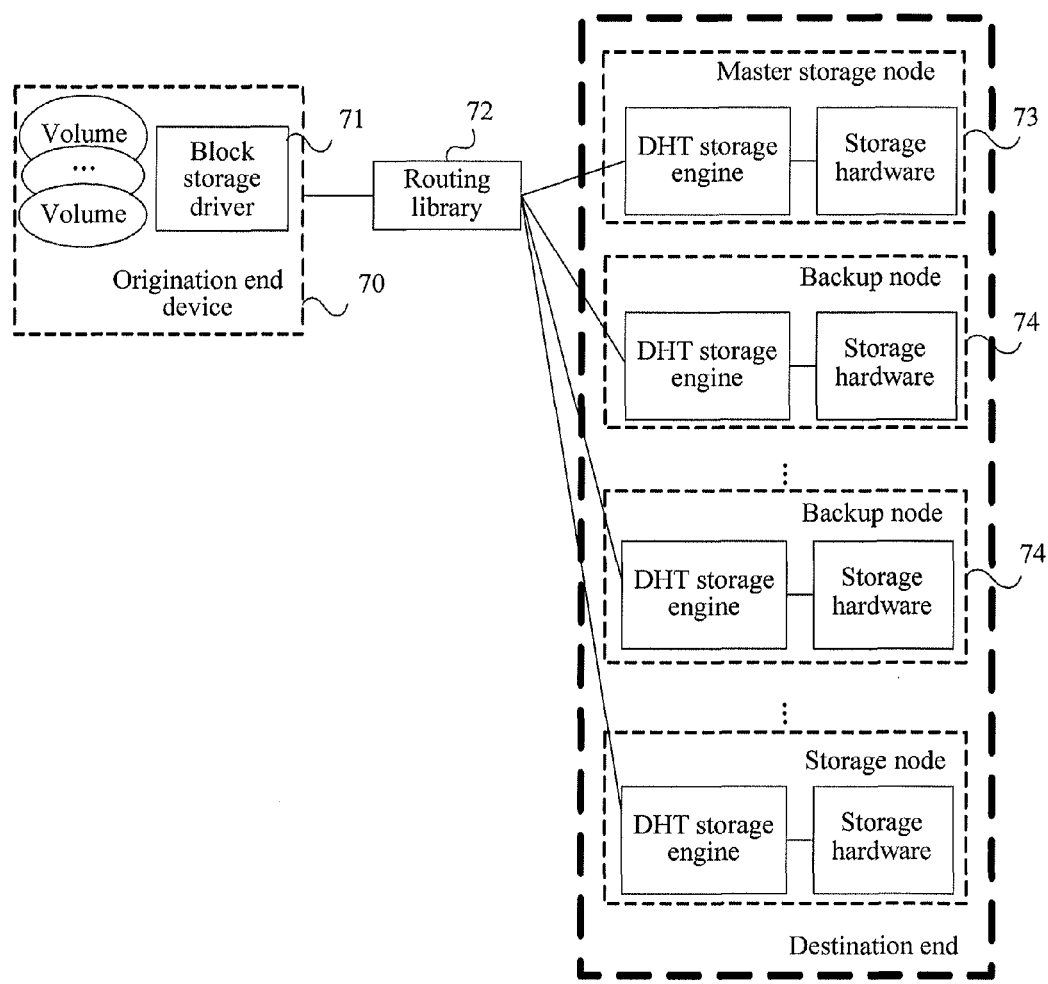
FIG. 7 is a schematic structural diagram of an embodiment of a storage system according to the present disclosure.

FIG. 7 is a schematic structural diagram of an embodiment of a storage system according to the present disclosure. As shown in FIG. 7, the storage system may include a block storage driver 71, a routing library 72, a master storage node 73, and at least one backup node 74.

The block storage driver 71 is configured to receive a request for an LBA-based operation on a volume, convert the LBA-based operation request into a Key addressing-based operation request, and send the Key addressing-based operation request to the routing library 72, where the Key addressing-based operation request carries a Key corresponding to data to be operated.

The routing library 72 is configured to receive the Key addressing-based operation request sent by the block storage driver 71, and send, according to the Key corresponding to the data to be operated, the Key addressing-based operation request to the master storage node 73 and the at least one backup node 74 of the data to be operated.

The master storage node 73 is configured to receive the Key addressing-based operation request sent by the routing library 72 and perform a read or write operation on the data to be operated.

The at least one backup node 74 is configured to receive the Key addressing-based operation request sent by the routing library 72 and perform the read or write operation on the data to be operated.

Furthermore, the storage system in this embodiment may further include: an origination device 70 in which the block storage driver 71 is located, configured to: before the block storage driver 71 receives the request for the LBA-based operation on the volume, initiate and start the block storage driver 71 to save an IP address and a service port of at least one storage node in the storage system; when the routing library 72 is located in the block storage driver 71, save connections between the block storage driver 71 and all or part of storage nodes in the storage system; and receive a command for creating a volume, where the command includes a volume name of the volume to be created and a volume size of the volume to be created.

The block storage driver 71 may be further configured to: when the routing library 72 is located in the storage node, establish a connection between the block storage driver 71 and the storage node; and create a volume logic device in a local operating system of the origination device 70 according to the command which is for creating the volume and is received by the origination device 70.

The routing library 72 in this embodiment is further configured to: acquire an IP address and a service port of each storage node in the storage system, and a Hash region in the charge of each storage node, and establish connections between the routing library 72 and all or part of storage nodes in the storage system.

For example, the routing library 72 may hash the Key corresponding to the data to be operated, determine that a storage node taking charge of a Hash region in which the hashed Key is located is the master storage node 73 of the data to be operated, send the Key addressing-based operation request to the master storage node 73 of the data to be operated, determine, according to a predetermined backup policy, at least one backup node 74 of the data to be operated, and send the Key addressing-based operation request to the at least one backup node.

In an implementation manner of this embodiment, when the operation request is a write operation request, the data to be operated is data to be written, and the write operation request further carries the data to be written, the master storage node 73 may locally write, according to a Key of the data to be written, the data to be written, and record a version of the data to be written, and after the write operation is completed, return a write operation response to the routing library 72.

When the operation request is the write operation request, the data to be operated is the data to be written, and the write operation request further carries the data to be written, the at least one backup node 74 may locally write, according to the Key of the data to be written, the data to be written, and record the version of the data to be written, and after the write operation is completed, return the write operation response to the routing library 72.

At this time, the routing library 72 may further receive the write operation response according to a preset write operation policy, calculate the number of successful write operations, and return a response, which is a response to the Key addressing-based write operation request, to the block storage driver 71 according to the number of successful write operations and the preset write operation policy.

In another implementation manner of this embodiment, when the operation request is a read operation request and the data to be operated is data to be read, the master storage node 73 may read, according to a Key of the data to be read, the locally stored data to be read and a version of the data to be read, and return the read data, a version of the read data, and a read operation response to the routing library 72.

The at least one backup node 74 is configured to: when the operation request is the read operation request and the data to be operated is the data to be read, read, according to the key of the data to be read, the locally stored data to be read and the version of the data to be read, and return the read data, the version of the read data, and the read operation response to the routing library 72.

At this time, the routing library 72 is further configured to: receive the returned data according to a preset read operation policy, calculate the number of successful read operations, identify data of a latest version in the read data according to the number of successful read operations and the preset read operation policy, and return the data of the latest version to the block storage driver 71, so that the block storage driver 71 processes the data of the latest version and then returns data corresponding to the LBA-based read operation request.

In this embodiment, the block storage driver 71 may be implemented based on the DHT technology to implement functions of the receiving module 51, the conversion module 52, and the sending module 53 in the embodiment shown in FIG. 5 according to the present disclosure. For example, the block storage driver 71 may establish and maintain a connection with a destination end, and when the read or write operation on the volume occurs, convert the LBA-based operation request into the Key addressing-based operation request, and send the Key addressing-based operation request to the routing library 72. In this embodiment, the block storage driver 71 and the volume together form the origination device 70.

Figure 8:
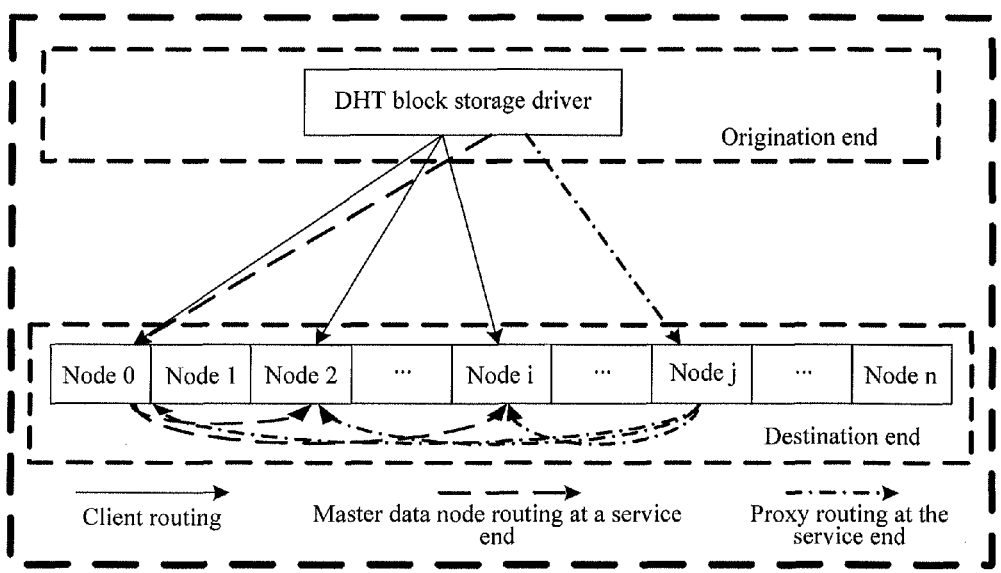
FIG. 8 is a schematic diagram of an embodiment of routing supported by a storage system according to the present disclosure.

In this embodiment, the routing library 72 is a virtual entity and may be implemented based on the DHT technology. The routing library 72 may be used as a library and placed in the block storage driver 71 or may be placed in a storage engine of the storage node. Definitely, the routing library 72 may also be placed in both the block storage driver 71 and the storage engine of the storage node. Alternatively, the routing library 72 exists as a separate entity. The main function of the routing library 72 is implementing distribution and routing of the Key addressing-based operation request. FIG. 8 is a schematic diagram of an embodiment of routing supported by a storage system according to the present disclosure. As shown in FIG. 8, Destination end has node 0, node 1, node 2 . . . node i . . . node j . . . node n. it is assumed that three copies are reserved for each data and a requested data is saved on node 0, node 2, and node i, and request routing supported by the storage system mainly includes the following three types:

(1) client routing: a client sends a Key addressing-based operation request separately to the nodes in which the data is located, where the client is the origination device 70.

(2) master data node routing at a service end: the client forwards the Key addressing-based operation request to a master storage node of the data, and then the master storage node distributes the data to backup nodes, where the routing manner may also be regarded as a special manner of a proxy routing at the service end; and (3) proxy routing at the service end: the client sends the Key addressing-based operation request to any one of storage nodes, the storage node plays a role of a proxy node to forward the Key addressing-based operation request to the storage node in which the data is located, where, definitely, the proxy node may also be the node in which the data is located.

When the routing library 72 placed in the block storage driver 71 corresponds to the client routing, the routing library 72 placed in the storage node corresponds to the two types of routing at the service end. Definitely, for some special requests, a combination of the client routing and the service end routing may also be used. In this case, both the block storage driver 71 and the storage node include the routing library 72.

The storage system provided by this embodiment is a DHT-based Key-value storage system, and the master storage node 73 and the at least one backup node 74 are storage nodes in a destination end of the DHT-based Key-value storage system, where the destination end is the service end. The DHT-based Key-value storage system is a distributed Key-value storage system implemented by using the DHT technology. The destination end of the DHT-based Key-value storage system includes several storage nodes. The storage nodes may be physically located in different racks or different data centers, but all of the storage nodes are logically located in a same Hash ring and are taking charge of different Hash regions. A storage node in which the data to be operated is located is sought for by hashing the Key carried in the Key addressing-based operation request. A segment of continuous data to be operated is likely stored in the storage nodes dispersedly. The storage node ensures data redundancy through the data copy and different replication policies (cross-rack backup or cross-data center backup) so as to improve reliability. Meanwhile, due to the characteristic that the data to be operated is stored dispersedly, in the DHT-based Key-value storage system, the origination device or the destination end performs concurrent I/O to reduce the I/O delay to improve the performance.

The storage node is formed by a DHT storage engine and storage hardware, is a minimum visible unit in the storage system, and is configured to process the Key addressing-based operation request and complete data read and write. (1) The DHT storage engine: completes data storage of the DHT-based Key-value storage system. If the routing library is included, the request routing at the service end may also be implemented. (2) The storage hardware: includes a physical disk. The physical disk may a common hard disk, for example, an integrated device electronics (Integrated Device Electronics; IDE for short) hard disk, a serial advanced technology attachment (Serial Advanced Technology Attachment; SATA for short) hard disk, or a solid-state hard disk, and is a major component of the storage hardware. Moreover, storage hardware of a single storage node further includes other hardware necessary to system operation, for example, a hardware device such as a central processing unit (Central Processing Unit; CPU for short), a memory, a main board, or a network card. Since a main bottleneck for read and write of the storage system is the disk, special hardware may be self-made to reduce the cost. For example, a CPU with a low dominant frequency and a relatively cheap advanced reduced instruction set computer machines (Advanced Reduced Instruction Set Computer Machines; ARM for short) architecture is adopted, and/or the memory is reduced.

In the storage system provided by this embodiment, an interface between the routing library 72 and the storage node of the destination end is a Key-value interface based on the Transmission Control Protocol (Transmission Control Protocol; TCP for short)/User Datagram Protocol (User Datagram Protocol; UDP), the Key is a unique identifier of the data to be operated, and the value is content of the data to be operated.

The storage system provided by this embodiment is the DHT-based Key-value storage system. Faults of the storage node are all automatically processed inside the DHT-based Key-value storage system, so as to preferably maintain the data redundancy, ensuring storage reliability and improving availability. Moreover, the DHT-based Key-value storage system also has good extensibility and theoretically may be unlimitedly expanded so as to expand the system capacity. Furthermore, the storage node in the DHT-based Key-value storage system itself supports the use of cheap hardware, thereby improving the cheapness of the storage system.

It can be understood by persons skilled in the art that the accompanying drawing is a schematic diagram of the exemplary embodiments only, and the modules or processes in the accompanying drawing is not necessarily indispensable for implementing the present disclosure.

It can be understood by persons skilled in the art that, modules in the apparatus in the embodiment may be distributed in the device of the embodiment according to the description of the embodiment, or be correspondingly changed to be placed in one or more apparatuses different from that in this embodiment. The modules according to the foregoing embodiment may be combined into one module, or split into multiple sub-modules.

Finally, it should be noted that the foregoing embodiments are merely provided for describing the solutions of the present disclosure, but not intended to limit the present disclosure. Although the present disclosure has been described in detail with reference to the foregoing embodiments, it should be understood by persons of ordinary skill in the art that modifications can be made to the solutions described in the foregoing embodiments, or equivalent replacements can be made to some features in the solutions, and such modifications or replacements do not cause the essence of corresponding solutions to depart from the spirit and scope of the present disclosure.

What is claimed is:

1. A data processing method, comprising:
   receiving, by a block storage driver of an origination device, a request for logical block addressing-based operation on a volume;
   converting, by the block storage driver, the logical block addressing-based operation request into a key addressing-based operation request according to the volume, wherein the key addressing-based operation request carries a key corresponding to data to be operated; and
   sending, by the block storage driver, the key addressing-based operation request to a routing library, so that the routing library sends, according to the key corresponding to the data to be operated, the key addressing-based operation request to a master storage node and at least one backup node of the data to be operated, and the master storage node and the at least one backup node perform a read or write operation on the data to be operated, wherein the sending, by the routing library according to the key corresponding to the data to be operated, the key addressing-based operation request to the master storage node and the at least one backup node of the data to be operated comprises:

hashing, by the routing library, the key corresponding to the data to be operated, determining that a storage node taking charge of a hash region in which the hashed key is located is the master storage node of the data to be operated, and sending the key addressing-based operation request to the master storage node of the data to be operated; and determining, by the routing library according to a predetermined backup policy, the at least one backup node of the data to be operated, and sending the key addressing-based operation request to the at least one backup node.

2. The method according to claim 1, wherein the method further comprises:

initializing and starting, by the origination device, the block storage driver to save an internet protocol address and a service port of at least one storage node in a storage system;

when the routing library is located in the block storage driver, saving, by the origination device, connections between the block storage driver and all or part of storage nodes in the storage system; when the routing library is located in the storage node, establishing, by the block storage driver, a connection between the block storage driver and the storage node;

receiving, by the block storage driver of the origination device, a command for creating the volume, wherein the command comprises a volume name of the volume to be created and a volume size of the volume to be created; and creating, by the block storage driver of the origination device, a volume logic device in a local operating system of the origination device according to the command.

3. The method according to claim 2, wherein the method further comprises:

acquiring, by the routing library, an internet protocol address and a service port of each storage node in the storage system, and a hash region in the charge of the each storage node, and establishing connections between the routing library and all or part of the storage nodes in the storage system.

4. The method according to claim 3, wherein when the operation request is a write data operation request, the write data operation request further carries data to be written, and the performing, by the storage master node and the at least one backup node, the write operation on the data to be operated comprises:

locally writing, by the master storage node and the at least one backup node, according to a key of the data to be written, the data to be written, recording a version of the written data, and after the write operation is completed, returning a write operation response to the routing library.

5. The method according to claim 4, further comprising:

receiving, by the routing library, the write operation response according to a preset write operation policy, calculating a number of successful write operations, and returning a response, which is a response to the key addressing-based write operation request, to the block storage driver according to the number of successful write operations and the preset write operation policy.

6. The method according to claim 3, wherein when the request for the data operation is a read data operation request, the performing, by the storage master node and the at least one backup node, the read operation on the data to be operated comprises:

reading, by the master storage node and the at least one backup node, according to a key of the data to be read, the locally stored data to be read and a version of the data to be read, and returning the read data, the version of the read data, and a read operation response to the routing library.

7. The method according to claim 6, further comprising:

receiving, by the routing library, the returned data according to a preset read operation policy, calculating a number of successful read operations, identifying data of a latest version in the read data according to the number of successful read operations and the preset read operation policy, and returning the data of the latest version to the block storage driver, so that the block storage driver processes the data of the latest version and then returns data corresponding to the logical block addressing-based read operation request.

8. A data processing apparatus, comprising:

a receiving module, configured to receive a request for a logical block addressing-based operation on a volume;

a conversion module, configured to convert the logical block addressing-based operation request into a key addressing-based operation request according to the volume, wherein the key addressing-based operation request carries a key corresponding to data to be operated; and a sending module, configured to send the key addressing-based operation request to a routing library, so that the routing library sends, according to the key corresponding to the data to be operated, the key addressing-based operation request to a master storage node and at least one backup node of the data to be operated, and the master storage node and the at least one backup node perform a read or write operation on the data to be operated, wherein the sending, by the routing library according to the key corresponding to the data to be operated, the key addressing-based operation request to the master storage node and the at least one backup node of the data to be operated comprises:

hashing, by the routing library, the key corresponding to the data to be operated, determining that a storage node taking charge of a hash region in which the hashed key is located is the master storage node of the data to be operated, and sending the key addressing-based operation request to the master storage node of the data to be operated; and determining, by the routing library according to a predetermined backup policy, the at least one backup node of the data to be operated, and sending the key addressing-based operation request to the at least one backup node.

9. The apparatus according to claim 8, further comprising:

an initialization module, configured to initialize and start the block storage driver;

a saving module, configured to save an internet protocol address and a service port of at least one storage node in a storage system, and when the routing library is located in the block storage driver, save connections between the block storage driver and all or part of storage nodes in the storage system;

a creation module, configured to, after the receiving module receives a command for creating the volume, create a volume logic device in a local operating system of an origination device according to the command, wherein the command comprises a volume name of the volume to be created and a volume size of the volume to be created.

10. A storage system, comprising a block storage driver, a routing library, a master storage node, and at least one backup node, wherein
- an origination device is configured to receive a request for a logical block addressing-based operation on a volume, convert the logical block addressing-based operation request into a key addressing-based operation request according to the volume, and send the key addressing-based operation request to the routing library, wherein the key addressing-based operation request carries a key corresponding to data to be operated;
- the routing library is configured to receive the key addressing-based operation request sent by the block storage driver, hash the key corresponding to the data to be operated, determine that a storage node taking charge of a hash region in which the hashed key is located is the master storage node, send the key addressing-based operation request to the master storage node of the data to be operated, determine, according to a predetermined backup policy, the at least one backup node of the data to be operated, and send the key addressing-based operation request to the at least one backup node;
- the master storage node is configured to receive the key addressing-based operation request sent by the routing library, and perform a read or write operation on the data to be operated;
- the at least one backup node is configured to receive the key addressing-based operation request sent by the routing library, and perform the read or write operation on the data to be operated.

11. The system according to claim 10, further comprising:
an origination end device in which the block storage driver is located, wherein the block storage driver is configured to: before the block storage driver receives the request for logical block addressing-based operation on the volume, initiate and start the block storage driver to save an internet protocol address and a service port of at least one storage node in the storage system; when the routing library is located in the block storage driver, save connections between the block storage driver and all or part of storage nodes in the storage system; and receive a command for creating the volume, wherein the command comprises a volume name of the volume to be created and a volume size of the volume to be created; and
the block storage driver, further configured to: when the routing library is located in the storage node, establish a connection between the block storage driver and the storage node; and create a volume logic device in a local operating system of the origination device according to the command for creating the volume received by the origination device.

12. The system according to claim 11, wherein
the routing library is further configured to acquire an internet protocol address and a service port of each storage node in the storage system, and a hash region in the charge of the each storage node, and establish connections between the routing library and all or part of the storage nodes in the storage system.

\* \* \* \* \*